D. M. ROBINSON.
BRAKE VALVE.
APPLICATION FILED SEPT. 14, 1909.
981,313.
Patented Jan. 10, 1911.
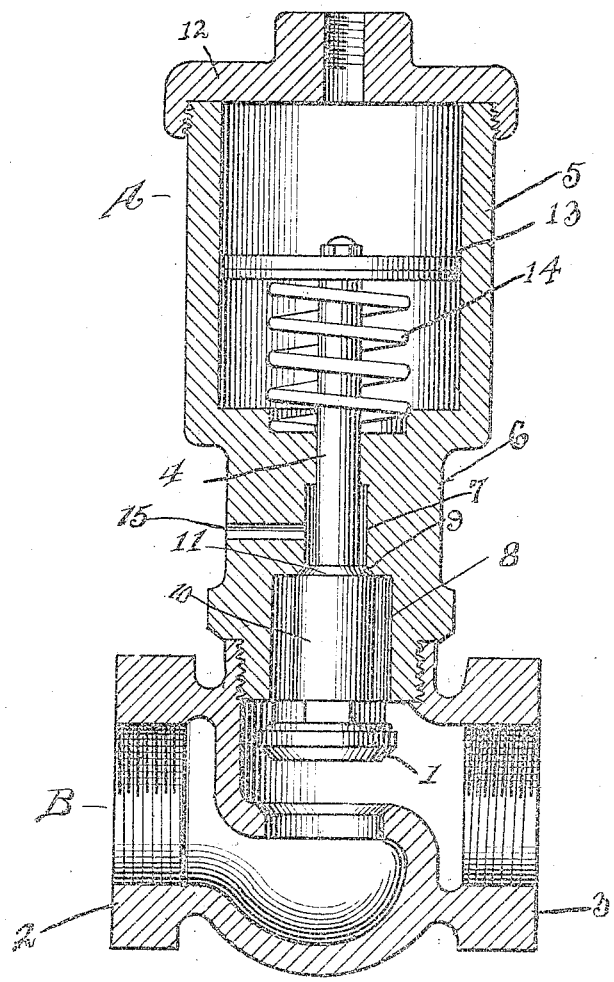

UNITED STATES PATENT OFFICE.

DAVID M. ROBINSON, OF ALLEGHENY, PENNSYLVANIA.

BRAKE-VALVE.

981,313.

Specification of Letters Patent.  Patented Jan. 10, 1911.

Application filed September 14, 1909. Serial No. 517,646.

*To all whom it may concern:*

Be it known that I, DAVID M. ROBINSON, a citizen of the United States, residing at Allegheny, in the county of Allegheny and State of Pennsylvania, have invented new and useful Improvements in Brake-Valves, of which the following is a specification.

The present invention provides a valve of novel and peculiar formation to be located in the train pipe of automatic air brake systems to admit of setting the brakes automatically in an emergency, said valve being adapted to be controlled independently of the engineer or other train operator so as to apply the brakes and bring the train to a standstill.

The invention provides a valve which when closed provides a passage for the escape of the air from the brake cylinder and which when open admits air under pressure to the brake cylinder, so as to overcome the force normally exerted to set the brakes and hold said brakes out of action.

The invention consists of the novel features, details of construction and combination of parts, which hereinafter will be more particularly set forth, illustrated in the accompanying drawing, and pointed out in the appended claim.

Referring to the drawing, forming a part of the specification, the same is a vertical central longitudinal section of a brake valve embodying the invention.

The valve comprises two sections A and B, which are preferably connected in a manner to admit of their separation. The section B consists of a valve casing having an inner partition formed with an opening, which is adapted to be closed by means of a valve 1 mounted to reciprocate. The valve casing is interposed in the length of the train pipe, the end 2 having connection with the pipe leading from the engineer's valve and the end 3 having connection with the pipe leading to the brake cylinder. The valve 1 is carried by a stem 4 arranged to reciprocate in the section A and to close downward upon the seat surrounding the opening in the partition of the valve casing.

The section A consists of a cylinder 5 and coupling end 6, the latter being reduced and having a central opening in which the stem 4 is mounted to reciprocate. The opening through the coupling end 6 is enlarged at 7 and further enlarged at 8, a valve seat 9 being formed at the end of the enlarged portion 7 or at the juncture of the parts 7 and 8. The valve stem has its lower portion enlarged at 10, the end of the enlargement being beveled to form a valve 11, which closes on the seat 9. When the valve 1 is open the valve 11 is closed and vice versa. The cylinder 5 is closed by means of a cap 12 having a centrally disposed boss formed with an opening to receive a pipe or connection leading from a source of supply of an operating medium, such as steam, air, water, or the like. A piston 13, secured to the upper end of the stem 4, is arranged to operate in the cylinder 5. A helical spring 14 of the expansible type is located in the lower portion of the cylinder 5 and surrounds the stem 4 and is confined between the piston 13 and the lower end of the cylinder, said lower end being recessed to form a seat for the lower end of the spring, whereby the latter is centered and retained in operative position. An opening 15 leads outward from the space 7 through a side of the coupling end 6 and constitutes a discharge or vent for the air or other medium from the brake cylinder.

In the practical operation of the invention the valve is located at any convenient point in the length of the train pipe and is normally held open by means of the spring 14, which presses the piston 13 upward, thereby admitting air or other motive medium to pass to the brake cylinder to hold the brakes out of action. The upper portion of the cylinder 5 is connected with means for supplying air, steam, or like medium for operating the piston 13, and which means are adapted to be controlled in any manner by electrical devices or otherwise, so that at a critical moment air or like motive medium is admitted into the upper portion of the cylinder 5 and exerts a downward pressure on the piston 13 to overcome the force of the spring 14 and press the valve 1 downward upon its seat, thereby shutting off air or motive medium to the brake cylinder and at the same time unseating the valve 11, whereby the air or other motive medium from the brake cylinder may escape backward through the train pipe and out through the spaces 8 and 7 and the discharge opening 15 with the result that the brakes are automatically set. Upon relieving the piston 13 of the pressure exerted downward thereon, the spring 14 moves said piston upward and seats the valve 11 and unseats the valve 1, thereby permitting motive medium to pass through the train pipe to the brake cylinder and release the brakes.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

The herein described brake valve comprising two sections adapted to be detachably connected, one of the sections consisting of a valve casing, the other section comprising a cylinder and a coupling end, a cap closing the open end of the cylinder and said coupling end having an opening therethrough which is enlarged to form stepped portions, and having a lateral discharge opening leading from the smaller enlargement of said opening, a valve for closing the opening through the valve casing, a stem connected with said valve and operating through the opening of the coupling end and having its lower end enlarged and terminating in a valve which closes upon a seat formed between the stepped portions of the enlarged opening of the coupling end, a piston arranged to operate in the cylinder and attached to said stem, and a spring surrounding the stem and exerting an upward pressure upon the piston to normally hold the main valve open and the second valve seated.

In testimony whereof I affix my signature in presence of two witnesses.

DAVID M. ROBINSON.

Witnesses:
V. B. HILLYARD,
JOHN L. FLETCHER.